United States Patent Office 2,733,746
Patented Feb. 7, 1956

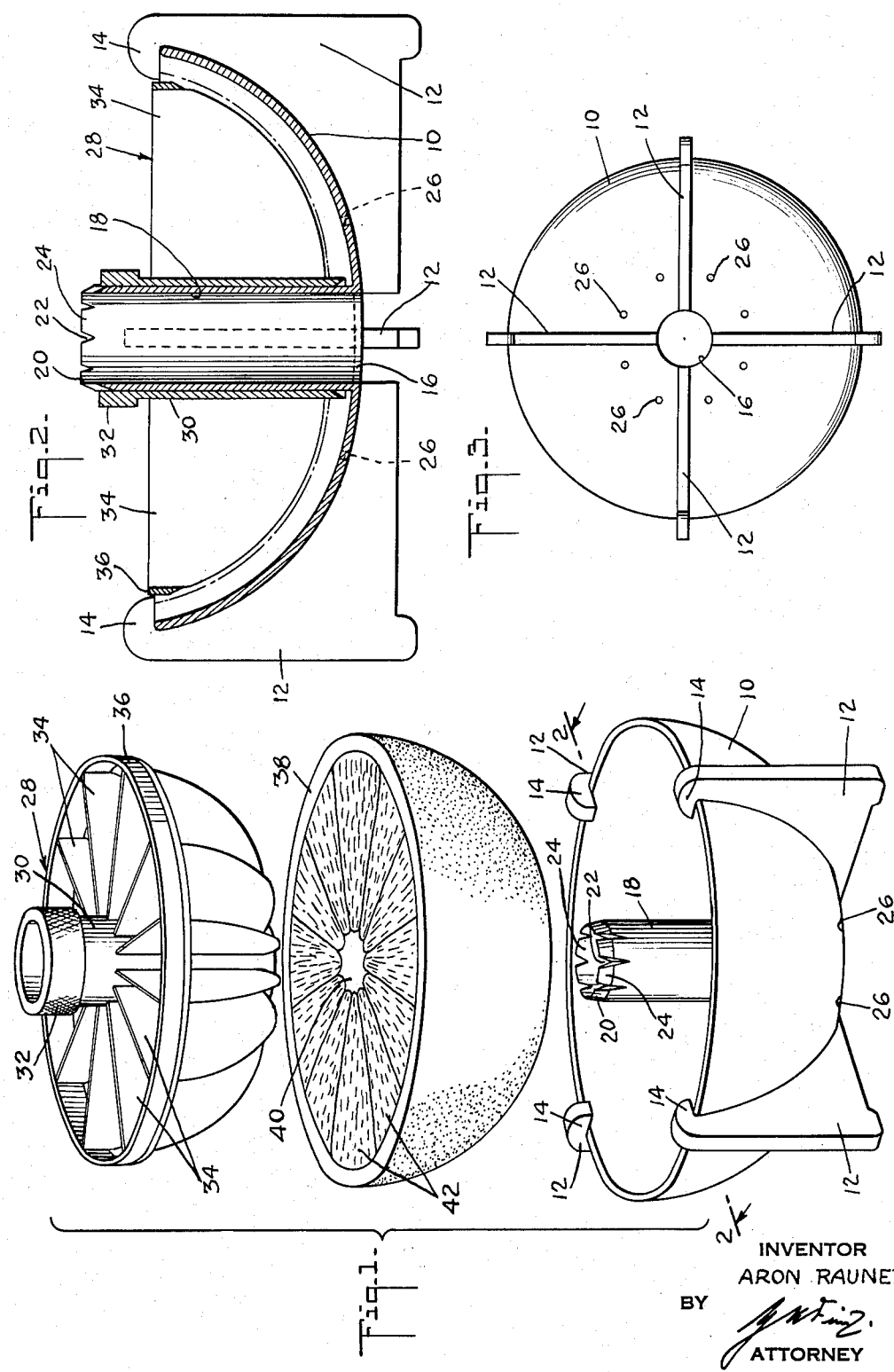

2,733,746

SERVING DISH FOR FRUITS

Aron Rauner, New York, N. Y.

Application June 23, 1953, Serial No. 363,444

7 Claims. (Cl. 146—3)

This invention relates to household articles, and more particularly to a serving dish for fruits, especially of the citrus type.

An object of the invention is to provide a serving dish for fruits equipped with means for separating the core of a fruit, for example a grapefruit, from the sections of the fruit when the fruit is placed into the dish.

A further object of the invention is to provide a serving disk for fruits equipped with means for separating at once all sections of the fruit, for example a grapefruit, from each other while the fruit is placed into the dish.

Another object is to provide a serving dish for fruits which holds the fruit in its place so that it must not be held while it is eaten.

Another object of the invention is to provide a serving dish for fruits which prevents the overflowing of juice while the fruit is being eaten.

Still another object of the invention is to provide a serving dish for fruits which may be manufactured at low costs.

Other objects and structural details of the invention will be apparent from the following description when read in conjunction with the accompanying drawings forming part of this specification, wherein:

Fig. 1 is an exploded perspective view of a serving dish according to the invention, said view showing also a grapefruit, Fig. 2 is a sectional view of the serving dish taken on line 2—2 of Fig. 1, and Fig. 3 is an underneath plan view of the serving dish according to the invention.

Referring now to the drawings, 10 indicates a bowl having an inner surface substantially defining a hemispherical cavity. Preferably the inner surface of the bowl is rough for a better hold of the fruit to be placed into the bowl. Said bowl 10 is carried by four supports 12. Each support has a projection 14 at its upper end, said projection overlapping the upper edge of the bowl 10 and extending somewhat towards the center of the bowl.

As best shown in Figs. 2 and 3, the bowl 10 has a center bore 16. A tubular coring element 18 rigid with the body of the bowl 10 is in register with said center bore 16. According to the embodiment shown in the drawings said tubular element 18 is integral with the body of the bowl 10; however, if desired, said tubular element could be a separate piece secured to the body of the bowl in any suitable manner.

Said tubular coring element 18 extends upwardly in the center of the bowl projecting somewhat above the plane of the upper edge of the bowl 10 according to the embodiment shown in the drawings, the upper edge 20 of the tubular element 18 is sharpened. Furthermore said upper edge 20 is provided with a plurality of serrations 22 whereby a plurality of teeth 24 is formed.

As best shown in Figs. 2 and 3, the bowl 10 is provided with a plurality of passages 26 arranged in a circle surrounding the center hole 16.

As best shown in Figs. 1 and 2, 28 generally indicates a cutter slidably and detachably mounted on the tubular center element 18 of the dish. Said cutter 28 comprises a tube 30 having a flange 32 at its upper end. Preferably, the outer surface of said flange 32 is knurled for a better grip by the fingers of a hand. A series of radially extending cutting blades 34 is attached to the circumference of said tube 30. A ring 36 surrounding the upper portion of the cutting blades 34 is attached to the latter in any suitable manner. The tube 30 of the cutter 28 is slidably engaged with the tubular element 18 of the dish.

The cutter 28 is made of metal or a plastic.

The bowl 10 with its tubular element 18 and the supports 12 may be made of any suitable material, for example a plastic or a metal.

The serving dish according to the invention may be used in the following manner:

At first the cutter 28 is removed from the tubular element 18.

Preferably, the serving dish is placed on a saucer (not shown in the drawings).

A fruit 38, for example a grapefruit half, is placed into the bowl 10 and during this operation the fruit 38 is slightly rotated back and forth, whereby the sharpened and serrated upper edge 20 of the tubular coring element 18 severs the core 40 of the fruit from the sections 42 of the latter. The core of the fruit may be removed later on from the interior of the tubular coring element 18.

When the fruit 38 is placed entirely into the bowl, the overlapping portions 14 of the supports 12 are engaged with the peel of the fruit holding the latter in its place.

If it is desired to separate the sections 42 of the fruit from each other, the cutter 28 is slid over the tubular element 18 and pressed into the fruit as far as possible. The flange 32 of the cutter 28 facilitates the handling thereof.

Any juice that may be squeezed out of the fruit during the cutting of the sections 42 from each other or any excess juice that might be squeezed out of the fruit while it is eaten may escape through the passages 26 into the saucer.

It will be readily understood that all of the sections 42 are separated from each other at once when the cutter 28 is pressed into the fruit.

Of course, before eating the fruit, the cutter 28 is removed.

I have described preferred embodiments of my invention, but it is understood that this disclosure is for the purpose of illustration and that various omissions or changes in shape, proportion and arrangement of parts, as well as the substitution of equivalent elements for those herein shown and described may be made without departing from the spirit and scope of the invention as set forth in the appended claims.

For example the tubular coring element 18 may be provided with different means for severing the core of the fruit from the sections.

Furthermore, the cutter 28 may be provided with a cover covering the cutting blades for preventing juice from squirting into the face of the user.

What I claim is:

1. A serving dish for fruits, comprising in combination: a bowl of rigid material having an inner surface substantially defining a hemispherical cavity, a tubular coring element coaxial with the center axis of said bowl, the lower end of said coring element being rigid with the bottom portion of said bowl, said coring element extending upwardly within said bowl, and cutting means arranged at the upper end of said coring element.

2. A serving dish for fruits, comprising in combination:

a bowl of rigid material having an inner surface substantially defining a hemispherical cavity, a tubular coring element coaxial with the center axis of said bowl, the lower end of said coring element being rigid with the bottom portion of said bowl, said coring element extending upwardly within said bowl, and cutting means arranged at the upper end of said coring element, said cutting means being near to the plane of the upper edge of said bowl.

3. In a serving dish as claimed in claim 1, said cutting means being formed by a serrated upper edge of said tubular element.

4. In a serving dish as claimed in claim 1, said bowl having a center bore, and said coring element being in register with said center bore.

5. In combination with a serving dish as claimed in claim 1, a series of holding elements arranged at the edge of said bowl, said holding elements projecting towards the center of said bowl for engagement with the peel of the fruit.

6. In combination with a serving dish as claimed in claim 1, supporting means, said bowl being arranged on said supporting means, said supporting means including projections extending over the edge of said bowl towards the center of the latter so as to form holding means for engagement with the peel of the fruit.

7. A serving dish for fruits as claimed in claim 1, the bottom of said bowl being provided with a series of passages connecting the interior with the outside.

References Cited in the file of this patent

UNITED STATES PATENTS

| | | |
|---|---|---|
| 1,046,590 | Haskell | Dec. 10, 1912 |
| 1,180,119 | Ericson | Apr. 18, 1916 |
| 1,246,624 | Lundahl | Nov. 13, 1917 |
| 1,423,490 | Vafiades et al. | July 18, 1922 |
| 2,402,558 | LaBerge | June 25, 1946 |
| 2,414,053 | McCarthy | Jan. 7, 1947 |
| 2,582,245 | Folli | Jan. 15, 1952 |
| 2,647,549 | Koch | Aug. 4, 1953 |

FOREIGN PATENTS

| | | |
|---|---|---|
| 512,309 | Great Britain | Aug. 31, 1939 |